United States Patent [19]

Ohsato

[11] Patent Number: 5,140,577
[45] Date of Patent: Aug. 18, 1992

[54] TRACKING ERROR SIGNAL GENERATING CIRCUIT FOR A MULTICHANNEL TYPE OPTICAL DISC PLAYER

[75] Inventor: Kiyoshi Ohsato, Chiba, Japan
[73] Assignee: Sony Corporation, Tokyo, Japan
[21] Appl. No.: 623,436
[22] PCT Filed: Apr. 23, 1990
[86] PCT No.: PCT/JP90/00522
 § 371 Date: Dec. 11, 1990
 § 102(e) Date: Dec. 11, 1990
[87] PCT Pub. No.: WO90/13116
 PCT Pub. Date: Nov. 1, 1990

[30] Foreign Application Priority Data
Apr. 24, 1989 [JP] Japan ............... 1-104201

[51] Int. Cl.$^5$ ............................... G11B 7/00
[52] U.S. Cl. ..................... 369/44.37; 369/44.41; 369/44.12; 369/44.11
[58] Field of Search ............ 369/112, 44.37, 109, 369/111, 44.11, 44.12, 44.13, 44.14, 44.17, 44.21, 44.22, 44.29, 44.31, 44.32, 44.38, 44.41, 44.42; 250/301.5

[56] References Cited

U.S. PATENT DOCUMENTS

| | | | |
|---|---|---|---|
| 4,449,212 | 5/1984 | Reno | 369/112 |
| 4,449,215 | 5/1984 | Reno | 369/111 |
| 4,617,654 | 10/1986 | Gross et al. | 369/44.29 |
| 4,621,351 | 11/1986 | Baer et al. | 369/112 |
| 4,633,455 | 12/1986 | Hudson | 369/44.37 |
| 4,720,825 | 1/1988 | Kokado | 369/44.37 |
| 4,918,679 | 4/1990 | Opheij et al. | 369/44.37 |
| 4,982,395 | 1/1991 | MacAnally | 369/44.37 |

FOREIGN PATENT DOCUMENTS

| | | | |
|---|---|---|---|
| 61-94246 | 5/1986 | Japan | |
| 61-224147 | 10/1986 | Japan | 369/44.37 |
| 1-144236 | 6/1989 | Japan | 369/44.37 |
| 1-256031 | 10/1989 | Japan | 369/44.37 |

Primary Examiner—Roy N. Envall, Jr.
Assistant Examiner—Thai Tran
Attorney, Agent, or Firm—Philip M. Shaw, Jr.

[57] ABSTRACT

In an apparatus for recording or reproducing signals recorded in tracks on an optical disk, a plurality of main light beams and a plurality of auxiliary light beams are generated and directed so that each of the main light beams impinge on a separate one of the tracks on the optical disk and each of the auxiliary light beams impinge between the tracks, main read light beams, corresponding to the reflections of the main light beams from the disk, and auxiliary read light beams, corresponding to reflections of the auxiliary light beams from the disk, are directed to a photosensor assembly, and the photosensor assembly includes a plurality of sensors for separately sensing each of the main read light beams and the auxiliary read light beams. Each of the sensors is bifurcated to produce a pair of output signals for each sensor. A tracking error is produced by summing the differences of the output signals from each sensor which senses a main read light beam to produce a first difference signal, summing the differences of the output signals from each sensor which senses an auxiliary read light beam to produce a second difference signal, and taking the difference of the first and second difference signals.

5 Claims, 4 Drawing Sheets

FIG. 6
FIG. 7
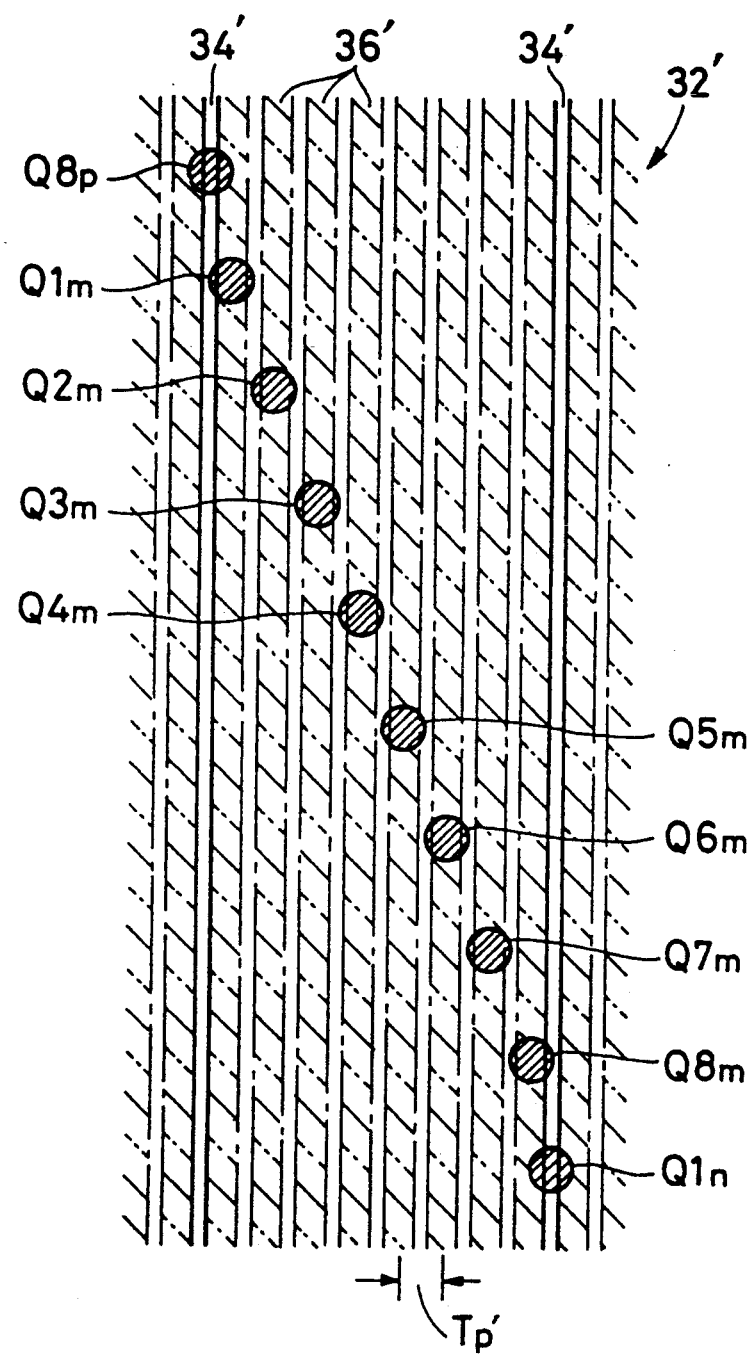
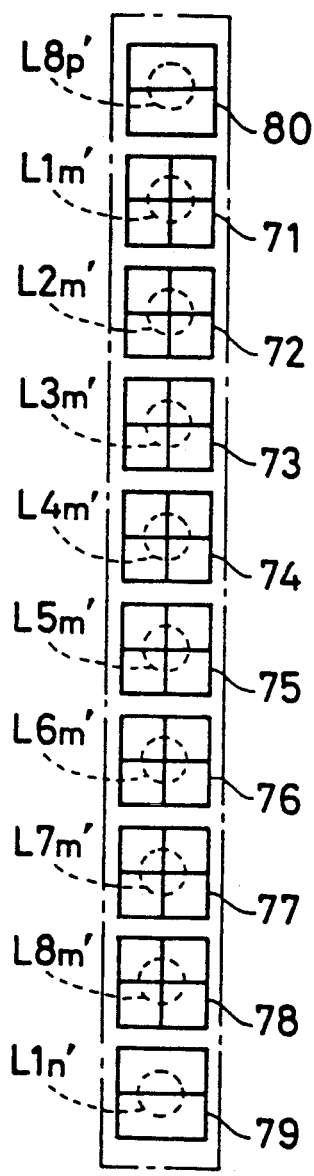

TRACKING ERROR SIGNAL GENERATING CIRCUIT FOR A MULTICHANNEL TYPE OPTICAL DISC PLAYER

BACKGROUND OF THE INVENTION

1. Field of the Invention

The present invention relates to an optical recording and/or reproducing apparatus operative to produce a plurality of light beams each divided into at least a main light beam and an auxiliary light beam and to cause the main and auxiliary light beams to impinge upon a disc-shaped record medium for recording information thereon or reproducing information therefrom and producing a tracking error signal.

2. Discussion of Prior Art

In an optical disc player for optically recording an information signal on or optically reproducing an information signal from an optical disc-shaped record medium, an optical head device is provided for constituting an optical arrangement for causing a light beam to impinge upon the optical disc-shaped record medium so as to form record tracks corresponding to a recording information signal on the optical disc-shaped record medium or to read an information signal recorded in the record tracks on the optical disc-shaped record medium.

In the optical head device, for example, a laser light beam produced by a light beam generating portion is collimated by a collimator lens and enters into an objective lens to be focused thereby to impinge upon the optical disc-shaped record medium, and a reflected light beam emanating from the optical disc-shaped record medium is directed through the objective lens to a beam splitter to be changed in a direction of its optical axis thereby so as to enter a photodetecting portion. Then, a reproduced information signal, a focus error signal and a tracking error signal are produced based on a detection output of the reflected light beam from the photodetecting portion.

For the production of the tracking error signal, various systems including the so-called "Push-Pull system" have been known. In the Push-Pull system, the reflected light beam from the optical disc-shaped record medium is detected by a photosensor having a photodetecting element divided into two parts, and the tracking error signal is produced based on a difference in level between detection outputs obtained from the two parts of the photodetecting elements, respectively. In the case where the tracking error signal is produced in accordance with the Push-Pull system, although an optical arrangement for obtaining the tracking error signal and an associated signal processing circuit arrangement can be relatively simple, there is the disadvantage that a light beam spot formed on the photosensor by the reflected light beam from the optical disc-shaped record medium is undesirably moved regardless of the tracking condition of the light beam impinging upon the optical disc-shaped record medium, and therefore the tracking error signal contains undesirable DC offsets when the optical disc-shaped record medium is inclined in its radial direction to the optical axis of the objective lens through which the light beam is incident upon the optical disc-shaped record medium.

Accordingly, with the intention of avoiding the above mentioned disadvantage of the Push-Pull system, there has been proposed an improved Push-Pull system as disclosed in the Japanese patent application published before examination with laid-open number 61-94246. In this case, at least two light beams which are obtained by dividing a light beam produced by a light beam source are caused to impinge upon an optical disc-shaped record medium for forming respective light beam spots thereon with a space therebetween in the radial direction of the optical disc-shaped record medium, which corresponds to a distance in a predetermined relation to the track pitch of the spiral record track. Then, each of two reflected light beams from the optical disc-shaped record medium is detected by a respective photosensor having a photodetecting element divided into two parts, and a difference in level between detection outputs obtained respectively from the two parts of one photodetecting element is subjected to a level adjustment for compensating a difference in strength between the two reflected light beams and then subtracted from a difference in level between detection outputs obtained respectively from the two parts of the other photodetecting element, thereby to produce the tracking error signal.

The tracking error signal thus obtained is prevented from containing DC offsets, so as properly to represent the tracking condition of the light beam impinging upon the optical disc-shaped record medium, even if it is inclined in its radial direction to the optical axis of the objective lens.

In addition to an ordinary optical disc player in which a single light beam is produced to impinge upon a disc-shaped record medium directly or after being divided into a plurality of light beams for recording information in or reproducing information from each record track on the disc-shaped record medium, the so-called "Multichannel Type" optical disc player has been also proposed. In the Multichannel Type optical disc player, a plurality of light beams are produced simultaneously so that each of the light beams produced simultaneously is caused to impinge upon a disc-shaped record medium directly or after being divided into a plurality of light beams for recording information in or reproducing information from a respective record track on the disc-shaped record medium. To such a Multichannel Type optical disc player, it is also desirable to apply the improved Push-Pull system for producing a tracking error signal in view of the advantage that a tracking error signal superior in quality can be obtained with simplified optical and circuit arrangements.

The previously proposed improved Push-Pull system, however, has been restricted to being applied to the optical disc player in which the single light beam is produced to impinge upon the disc-shaped record medium directly or after being divided into a plurality of light beams for recording information in or reproducing information from each record track on the disc-shaped record medium, and therefore no Multichannel optical disc player employing the improved Push-Pull system has been found.

SUMMARY OF THE INVENTION

Accordingly, it is an object of the present invention to provide an optical recording and/or reproducing apparatus of the Multichannel Type in which a plurality of light beams are simultaneously produced to impinge upon a disc-shaped record medium for recording information in or reproducing information from respective record tracks on the disc-shaped record medium and a tracking error signal is produced in accordance with the Push-Pull system so that the advantage that the tracking error signal is formed to be superior in quality with simplified optical and circuit arrangements is obtained.

According to the present invention, there is provided an optical recording and/or reproducing apparatus comprising an optical arrangement, including light beam generating means for producing N (where N is a positive integer larger than 1) light beams, light beam dividing means for dividing each of the N light beams into at least a main light beam and an auxiliary light beam, photosensing means, and optical path forming means for causing the N main light beams and the N auxiliary light beams to impinge upon a disc-shaped record medium and to guide N main read light beams and N auxiliary read light beams, which are reflected from the disc-shaped record medium, to the photosensing means, and a signal generating means for producing signals based on a detection output from the photosensing means.

The improvement according to the invention resides in that the optical path forming mans directs the N main light beams and the N auxiliary light beams with respect to the disc shaped record medium so that N main light beam spots are formed on the disc-shaped record medium at an interval spacing of M (M is a positive integer) times a track pitch on the disc-shaped record medium, N auxiliary light beam spots are formed on the disc-shaped record medium by the N auxiliary light beams, respectively, so as to each be the same distance, corresponding to N times the interval between two adjacent main light beam spots, from the corresponding main light beam spot, and the N auxiliary light beam spots are arranged at regularly spaced intervals in the radial direction of the disc-shaped record medium from respective ones of the N main light beam spots, each of such spaced intervals corresponding to K/2 (where K is an odd number) times the track pitch on the disc-shaped record medium. Further, the photosensing means includes photodetecting elements which are each divided substantially into two parts so as to output a pair of signals, with each photodetecting element of a first set separately detecting different ones of the N main read light beams, which form the main light beam spots, and each photo detecting element of a second set separately detecting different ones of the N auxiliary read light beams, which form the N auxiliary light beam spots.

Most significantly, the signal generating means computes a first difference signal by taking the sum of the differences between detection output signals obtained respectively from the two parts of the photodetecting elements of the first set, computes a second difference signal by taking the sum of the differences between detection output signals obtained respectively from the two parts of the photodetecting elements of the second set, and computes a tracking error signal based on the difference between the first difference signal and the second difference signal.

Consequently, with the optical recording and/or reproducing apparatus according to the present invention, the optical arrangement and the associated circuit arrangement provided for producing the tracking error signal are simple in configuration, and the tracking error signal produced by the optical arrangement and the associated circuit arrangement is prevented from containing DC offsets, so as properly to represent the tracking condition of each of the main light beams impinging upon the optical disc-shaped record medium, even if it is inclined in its radial direction to the optical axis of an objective lens through which the main and auxiliary light beams are incident upon the optical disc-shaped record medium.

BRIEF DESCRIPTION OF THE DRAWINGS

FIG. 6 is an enlarged illustration showing light beam spots formed on an optical disc in another embodiment of optical recording and/or reproducing apparatus according to the present invention; and FIG. 7 is a schematic illustration showing an example of a signal generating circuit employed in another embodiment of optical recording and/or reproducing apparatus according to the present invention.

DETAILED DESCRIPTION OF THE PREFERRED EMBODIMENTS

Figure 1:
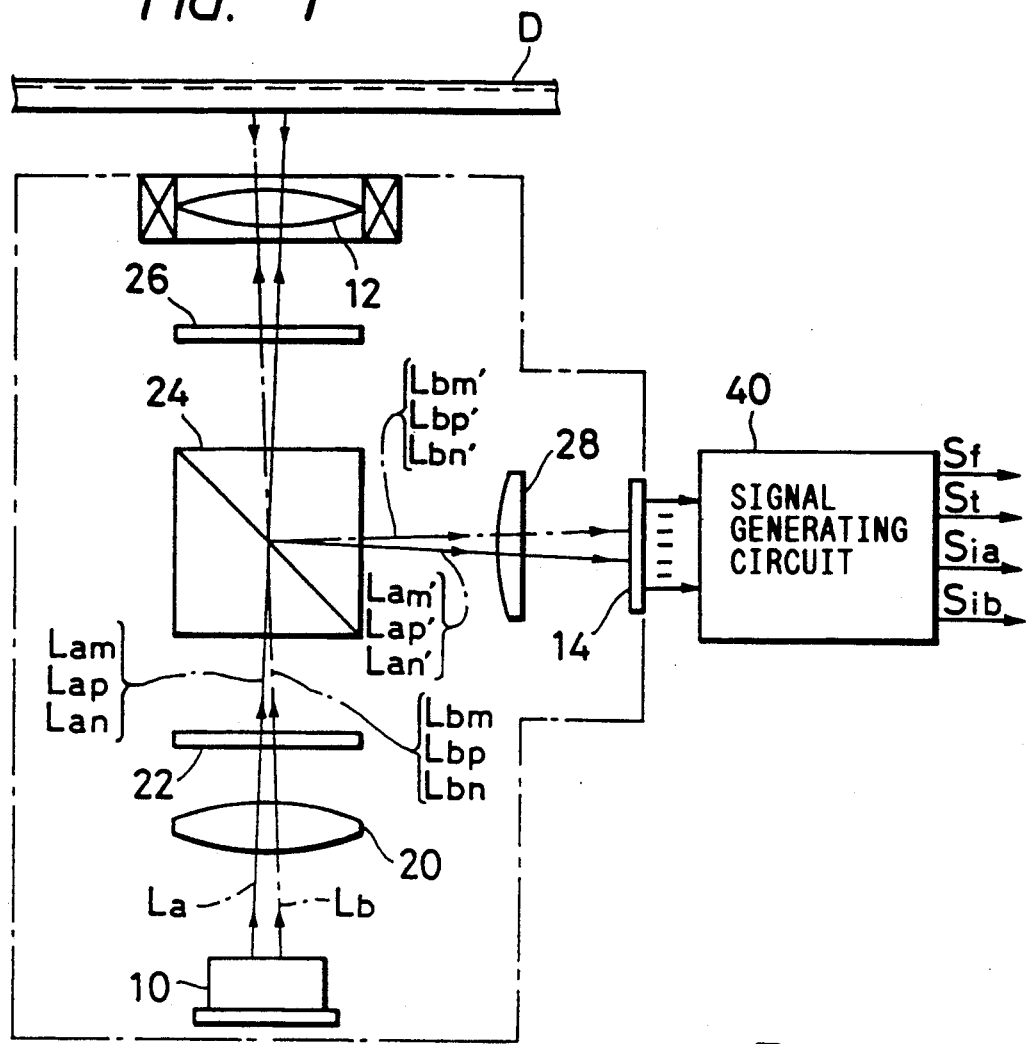
FIG. 1 is a schematic illustration showing a part of one embodiment of optical recording and/or reproducing apparatus according to the present invention.

FIG. 1 shows schematically an optical unit and a signal generating circuit forming a part of an embodiment of optical recording and/or reproducing apparatus according to the present invention, which constitutes an information reproducing system applied to, for example, an optical disc player.

Figure 2:
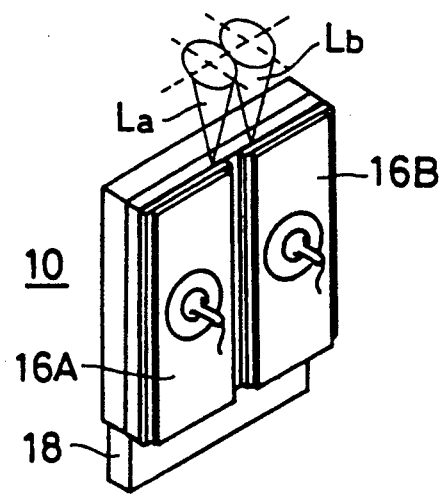
FIG. 2 is an enlarged, perspective illustration showing an example of a semiconductor laser device employed in the embodiment shown in FIG. 1.

The optical unit comprises a semiconductor laser device 10 for generating two laser light beams La and Lb, an objective lens 12 and a photosensor 14 and is able to move in a radial direction of a disc D which is an optical disc-shaped record medium. The semiconductor laser device 10 contains a laser beam generating portion composed of a couple of semiconductor laser elements 16A and 16B mounted on a common supporting member 18, as shown in FIG. 2. The laser light beams La and Lb are emitted from the semiconductor laser elements 16A aid 16B, respectively.

Each of the laser light beams La and Lb generated by the semiconductor laser device 10 is collimated by a collimator lens 20 and then falls on a grating device 22. With the grating device 22, each of the laser light beams La and Lb is divided into a center beam and a pair of side beams positioned at respective sides of the center beam. The center beam divided from the laser light beam La serves as a main light beam Lam and the side beams divided from the laser light beam La serve as auxiliary light beams Lap and Lan. Similarly, the center beam divided from the laser light beam Lb serves as a main light beam Lbm and the side beams divided from the laser light beam Lb serve as auxiliary light beams Lbp and Lbn. For the sake of simple illustration, the beams Lam, Lap and Lan are shown with a single solid line and the beams Lbm, Lbp and Lbn are shown with a single dot-dash line in FIG. 1.

Each of the main light beams Lam and Lbm and the auxiliary light beams Lap, Lan, Lbp and Lbn obtained from the grating device 22 passes through a polarized beam splitter 24 without changing the direction of its optical axis, and then through a ¼-wave plate 26 to the objective lens 12, and is focused by the objective lens 12 to impinge upon the disc D.

Figure 3:
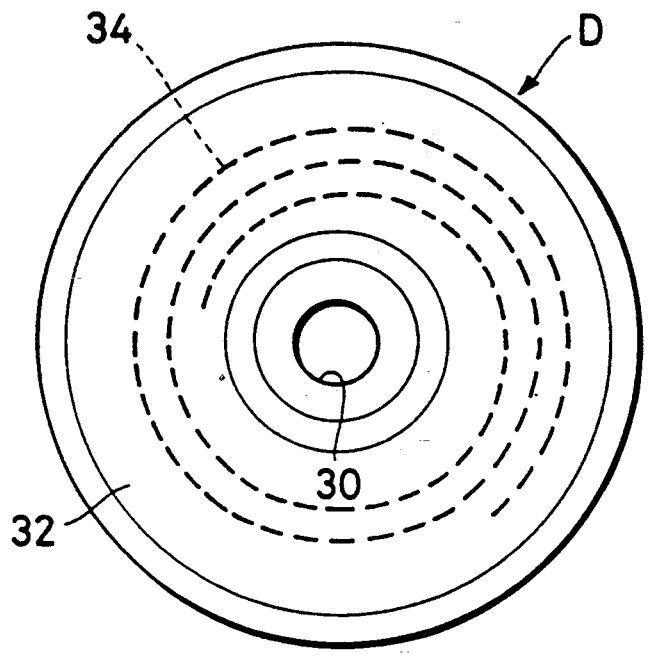
FIG. 3 is a schematic plane view showing an example of an optical disc used in the embodiment shown in FIG. 1.

As shown in FIG. 3, the disc D has a center hole 30 and an information recording area 32 around the center hole 30. On the information recording area 32, a spiral guide groove 34 is previously formed to surround the center hole 30 and a spiral record track is to be formed along the spiral guide groove 34. The spiral record track is to have a track pitch (the distance between the centers of two adjacent turns of the spiral record track) of, for example, about 1.6 $\mu$m, and each turn of the spiral record track is for convenience defined to be one track.

The main light beams Lam and Lbm and the auxiliary light beams Lap, Lan, Lbp and Lbn incident upon the disc D are modulated in intensity by the spiral guide groove 34 or the spiral record track, and are reflected as main light beams Lam' and Lbm' and reflected auxiliary light beams Lap', Lan', Lbp' and Lbn'. Each of the reflected main light beams Lam' and Lbm' and the reflected auxiliary light beams Lap', Lan', Lbp' and Lbn' passes through the objective lens 12 and the ¼-wave plate 26 to the polarized beam splitter 24. Then, each of the reflected main light beams Lam' and Lbm' and the reflected auxiliary light beams Lap', Lan', Lbp' and Lbn' is deflected at the polarized beam splitter 24 so as to pass to the photosensor 14 through a receiving lens 28.

Figure 4:
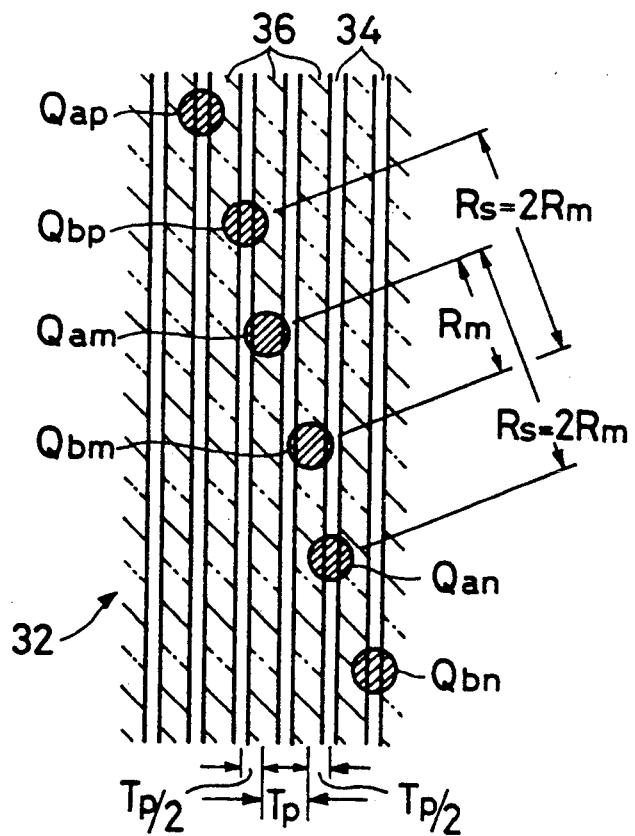
FIG. 4 is an enlarged illustration showing light beam spots formed on an optical disc in the embodiment shown in FIG. 1.

The objective lens 12, the polarized beam splitter 24, the ¼-wave plate 26 and the receiving lens 28 inclusive form an optical path forming device which is operative to cause the main light beams Lam and Lbm and the auxiliary light beams Lap, Lan, Lbp and Lbn obtained from the grating device 22 to impinge upon the disc D, and to guide the reflected main light beams Lam' and Lbm' and the reflected auxiliary light beams Lap', Lan', Lbp' and Lbn' from the disc D to the photosensor 14. The optical path forming device is adjusted to position the main light beams Lam and Lbm and the auxiliary light beams Lap, Lan, Lbp and Lbn each focused by the objective lens 12 to impinge upon the disc D in such a manner that, as shown in FIG. 4, in the information recording area 32 of the disc D, main light beam spots Qam and Qbm are formed by the main light beams Lam and Lbm, respectively, on respective spiral record tracks 36 so as to have a space therebetween in the radial direction of the disc D, which corresponds to a track pitch Tp on the disc D, and to be distant by a distance Rm from each other. The auxiliary light beam spots Qap and Qan are formed by the auxiliary light beams Lap and Lan, respectively, so as to be respectively distant by a distance Rs corresponding to twice the distance Rm from the corresponding main light beam spot Qam which is positioned between the auxiliary light beams Qap and Qan. The auxiliary light beam spots Qbp and Qbn are formed by the auxiliary light beams Lbp and Lbn, respectively, so as to be respectively distant by the distance Rs from the corresponding main light beam Qbm which is positioned between the auxiliary light beams Qbp and Qbn. The main light beam spot Qam and the corresponding auxiliary light beam spots Qap and Qan are intervals with respect to each other at regularly spaced intervals in the radial direction of the disc D, each of which corresponds to K/2 times the track pitch Tp, for example, 3Tp/2, and the main light beam spot Qbm and the corresponding auxiliary light beam spots Qbp and Qbn are arranged at regularly spaced intervals in the radial direction of the disc D, each of which corresponds to K/2 times the track pitch Tp, for example, 3Tp/2.

The photosensor 14 upon which each of the reflected main light beams Lam' and Lbm' and the reflected auxiliary light beams Lap', Lan', Lbp' and Lbn' is incident has a first photodetecting element for detecting the reflected main light beam Lam', a second photodetecting element for detecting the reflected main light beam Lbm', a third photodetecting element for detecting the reflected auxiliary light beam Lan', and a fourth photodetecting element for detecting the reflected auxiliary light beam Lbp'. Detection output signals obtained from the first, second, third and fourth photodetecting elements of the photosensor 14 are supplied to a signal generating circuit 40 to produce a focus error signal Sf, a tracking error signal St, a reproduced information signal Sia based on the main light beam spot Qam, and a reproduced information signal Sib based on the main light beam spot Qbm.

Figure 5:
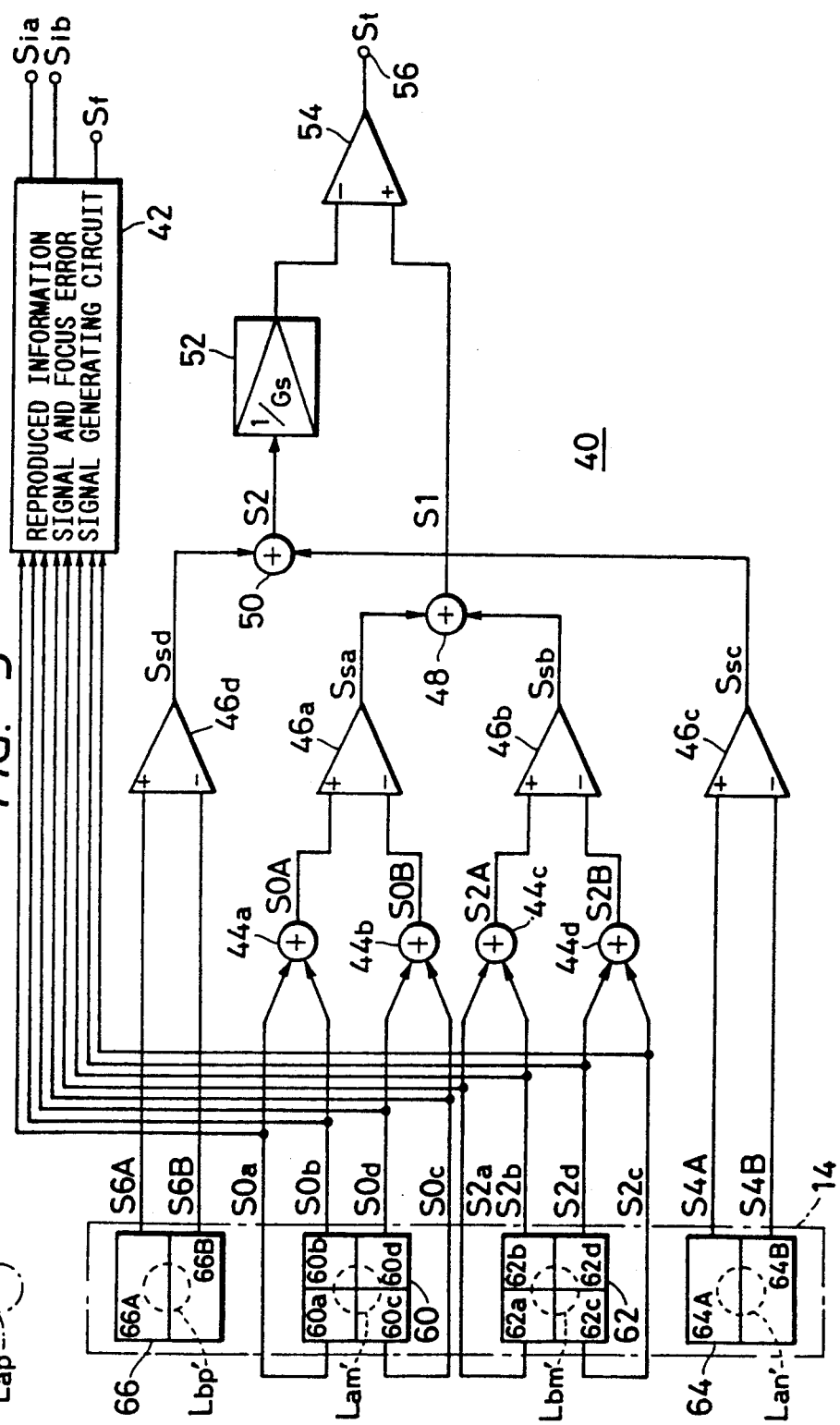
FIG. 5 is a schematic illustration showing an example of an optical unit and an example of a signal generating circuit employed in the embodiment shown in FIG.1.

FIG. 5 shows one example of configuration including the photosensor 14 and the signal generating circuit 40 employed in the embodiment shown in FIG. 1.

Referring to FIG. 5, the photosensor 14 comprises operationally bifurcated photodetecting elements, i.e. a photodetecting element 60 for detecting the reflected main light beam Lam' as the first photodetecting element, which is divided into four parts 60a, 60b, 60c and 60d disposed close to one another, a photodetecting element 62 for detecting the reflected main light beam Lbm' as the second photodetecting element, which is divided into four parts 62a, 62b, 62c and 62d disposed close to one another, a photodetecting element 64 for detecting the reflected auxiliary light beams Lan' as the third photodetecting element, which is divided into two parts 64A and 64B disposed close to each other, and a photodetecting element 66 for detecting both of the reflected auxiliary light beams Lbp' as the fourth photodetecting element, which is divided into two parts 66A and 66B disposed close to each other.

Pairs of detection output signals S0a, S0b, S0c and S0d obtained from the parts 60a, 60b, 60c and 60d of the photodetecting element 60, respectively, and detection output signals S2a, S2b, S2c and S2d obtained from the parts 62a, 62b, 62c and 62d of the photodetecting element 62, respectively, are supplied to a reproduced information signal and focus error signal generating circuit 42 forming a part of the signal generating circuit 40. In the reproduced information signal and focus error signal generating circuit 42, the reproduced information signals Sia and Sib and the focus error signal Sf are separately produced based on the detection output signals S0a to S0d and S2a to S2b.

Further, in the signal generating circuit 40, the detection output signals S0a and S0b are added to each other in an adder 44a to produce an added signal S0A (=S0a + S0b), and the detection output signals S0c and S0d are also added to each other in an adder 44b to produce an added signal S0B (=S0c+S0d). The added signals S0A and S0B are substantially equivalent to detection output signals obtained from first and second detecting parts, respectively, as if the photodetecting element 60 were divided into the first detecting part which corresponds to the parts 60a and 60b combined with each other and the second detecting part which corresponds to the parts 60c and 60d combined with each other.

Then, the added signals S0A and S0B are supplied to a subtracter 46a to produce a difference signal Ssa (=S0A−S0B).

Similarly, the detection output signals S2a and S2b are added to each other in an adder 44c to produce an added signal S2A (=S2a+S2b), and the detection output signals S2c and S2d are also added too each other in an adder 44d to produce an added signal S2B (=S2c+S2d). The added signals S2A and S2B are substantially equivalent to detection output signals obtained from first and second detecting parts, respectively, as if the photodetecting element 62 were divided into the first detecting part which corresponds to the parts 62a and 62b combined with each other and the second detecting part which corresponds to the parts 62c and 62d combined with each other. Then, the added signals S2A and S2B are supplied to a subtracter 46b to produce a difference signal Ssb (=S2A−S2B).

The difference signals Ssa and Ssb are added to each other in an adder 48 to produce an added signal S1 (=Ssa +Ssb).

Detection output signals S4A and S4B obtained from the parts 64A and 64B of the photodetecting element 64, respectively, are supplied to a subtracter 46c to produce a difference signal Ssc (=S4A−S4B), and detection output signals S6A and S6B obtained from the parts 64A and 64B of the photodetecting element 66, respectively, are supplied to a subtracter 46d to produce a difference signal Ssd (=S6A −S6B). The difference signals Ssc and Ssd are supplied to an adder 50 to produce an added signal S2 (=Ssc+Ssd).

The added signal S1 from the adder 48 is directly supplied to one of input terminals of a subtracter 54. The added signal S2 from the adder 50 is supplied to a level controller 52 to be subjected therein to level adjustment with a gain of 1/Gs and is then supplied to the other of input terminals of the subtracter 54. The gain 1/Gs in the level controller 52 is set in response to a ratio in intensity Gs of each of the auxiliary light beams Lap and Lan or each of the auxiliary light beams Lbp and Lbn to the main light beam Lam or the main light beam Lbm. From the subtracter 54, a difference signal (=S1−S2/Gs) which corresponds a level difference between the added signal S1 from the adder 48 and the added signal S2 having adjusted in level with the gain of 1/Gs from the level controller 52 is obtained, to be the tracking error signal St derived from a output terminal 56.

Where the tracking error signal St is produced as described above, if Ia stands for the intensity of the main light beam Lam, Ib stands for the intensity of the main light beam Lbm, u stands for the displacement of each of the main light beam spots Qam and Qbm formed on the information recording area 32 of the disc D from the center of the spiral record track 36 in the radial direction of the disc D, the following equations are satisfied:

$$Ssa = S0A - S0B$$
$$= Ia[a \cdot \cos\{2\pi(u - Tp/2)/Tp\} + b]$$

$$Ssb = S2A - S2B$$
$$= Ib[a \cdot \cos\{2\pi(u + Tp/2)/Tp\} + b]$$

$$Ssc = S4A - S4B$$
$$= Gs \cdot Ia\{a \cdot \cos(2\pi u/Tp) + b\}$$

-continued
$$Ssd = S6A - S6B$$
$$= Gs \cdot Ib\{a \cdot \cos(2\pi u/Tp) + b\}$$

where a stands for amplitude and b stands for a DC offset component.

Accordingly, the following equation is further satisfied.

$$St = S1 - S2/Gs$$
$$= (Ssa + Ssb) - (Ssc + Ssd)/Gs$$
$$= -2(Ia + Ib) \cdot a \cdot \cos(2\pi u/Tp)$$

Consequently, the tracking error signal St obtained at the output terminal 56 does not include the DC offset component, and is prevented from having phase deviations.

FIG. 6 shows light beam spots formed by laser light beams on an information recording area 32' of a disc D' which is an optical disc-shaped record medium for information recording thereon and information reproduction therefrom and is attached to an optical unit of another embodiment of optical recording and/or reproducing apparatus according to the present invention, which forms an information reproducing system applied to an optical disc player.

The disc D' resembles the disc D shown in FIG. 3 in outward appearance, but in the information recording area 32' of the disc D', eight record tracks 36' are disposed at regularly spaced intervals between two adjacent guide grooves 34'.

The optical unit of the optical recording and/or reproducing apparatus which is used for reproducing information from the disc D' is operative to produce eight individual laser light beams, each of which is divided into a main light beam and two auxiliary light beams by a grating device to form twenty four laser light beams to impinge upon the disc ' in such a manner that eight main light beams are incident upon respective eight record tracks 36' between two adjacent guide grooves 34' for reading information from the eight record tracks 36' simultaneously.

In this case, in the information recording area 32' of the disc D', eight main light beam spots Q1m, Q2m, Q3m, Q4m, Q5m, Q6m, Q7m and Q8m are formed by the eight main light beams, respectively, on respective eight record tracks 36' so as to have a space therebetween in the radial direction of the disc D', which corresponds to a track pitch Tp' on the disc D', and to be arranged at regularly spaced intervals, and sixteen auxiliary light beam spots are formed by sixteen auxiliary light beams, respectively, in such a manner that each two of the sixteen auxiliary light beam spots are respectively distant by a distance corresponding to eight times the interval between two adjacent main light beam spots from the corresponding main light beam spot. In FIG. 6, only an auxiliary light beam spot Q1n which is formed by one of two auxiliary light beams corresponding to the main light beam which forms the main light beam spot Q1m and an auxiliary light beam spot Q8p which is formed by one of two auxiliary light beams corresponding to the main light beam which forms the main light beam spot Q8m are shown. Two auxiliary light beam spots corresponding to each of the main light beam spots Q1m to Q8m are respectively distant by the same distance from the corresponding main light beam with a space therebetween in the radial direction of the disc D', which corresponds to H/2 (H is an odd number) times the track pitch Tp', for example, 15Tp'/2.

A photosensor upon which reflected main and auxiliary light beams from the disc D' are incident comprises eight photodetecting elements 71, 72, 73, 74, 75, 76, 77 and 78 for detecting respectively eight reflected main light beams L1m', L2m', L3m', L4m', L5m', L6m', L7m' and L8m' emanating from the main light beam spots Q1m to Q8m on the information recording area 32' of the disc D', each of which is divided into four parts disposed close to one another, a photodetecting element 79 for detecting a reflected auxiliary light beam L1n' emanating from the auxiliary light beam spot Q1n on the information recording area 32' of the disc D', which is divided into two parts disposed close to each other, and a photodetecting element 80 for detecting a reflected auxiliary light beam L8p' emanating from the auxiliary light beam spot Q8p on the information recording area 32' of the disc D', which is divided into two parts disposed close to each other.

In a signal generating circuit connected with the photodetector, eight reproduced information signals are obtained in response to the reflected main light beams L1m' to L8m' based on detection output signals of the photodetecting elements 71 to 78, respectively, and a focus error signal is also obtained based on the detection output signals of the photodetecting elements 71 to 78. Further, the photodetecting elements 71 and 78 for detecting the reflected main light beams L1m' and L8m' emanating respectively from the main light beam spots Q1m and Q8m which are positioned at the respective ends of the arrangement of the main light beam spots Q1m to Q8m on the information recording area 32' of the disc D', the photodetecting element 79 for detecting the reflected auxiliary light beam L1n' emanating from the auxiliary light beam spot Q1n, and the photodetecting element 80 for detecting the reflected auxiliary light beam L8p' emanating from the auxiliary light beam spot Q8p are selected to correspond to the photodetecting elements 60, 62, 64 and 66 shown in FIG. 5, and a tracking error signal is produced based on the detection output signals from the photodetecting elements 71, 78, 79 and 80 in a circuit provided in the same manner as the circuit shown in FIG. 5 which produces the tracking error signal St based of the detection output signals from the photodetecting elements 60, 62, 64 and 66. The tracking error signal thus obtained based on the detection output signals from the photodetecting elements 71, 78, 79 and 80 also does not include a DC offset component, and is prevented from having phase deviations.

APPLICABILITY FOR INDUSTRIAL USE

Although two or eight individual light beams are generated and each of the individual light beams is divided into a main light beam and a pair of auxiliary light beams to be caused to impinge upon the disc which is the optical record medium in the above described embodiments, it is to be understood that, in the present invention, the number of light beams used in the optical unit is not limited and it is possible generally to use N light beams generated individually, each of which is divided into a main light beam and at least one auxiliary light beam to be caused to impinge upon the disc.

Further, although the tracking error signal is produced by a portion including an optical unit and a signal generating circuit forming an information reproducing system in the above described embodiments, it is to be understood that, in the optical recording and/or reproducing apparatus according to the invention, the tracking error signal can be also produced by a portion including an optical unit and a signal generating circuit forming an information recording system. That is, the tracking error signal can be produced based on reflected main and auxiliary light beams from a disc-shaped record medium when main and auxiliary light beams are caused to impinge upon the disc-shaped record medium for recording information thereon.

Although the present invention has been shown and described with respect to preferred embodiments, various changes and modifications which are obvious to a person skilled in the art to which the invention pertains are deemed to lie within the spirit and scope of the invention.

What is claimed is:

1. An optical recording and/or reproducing apparatus of the type comprising an optical arrangement, including light beam generating means for producing N (where N is a positive integer larger than 1) light beams, light beam dividing means for dividing each of the N light beams into at least a main light beam and an auxiliary light beam, photosensing means, and optical path forming means for causing the N main light beams and the N auxiliary light beams to impinge upon a disc-shaped record medium and to guide N main read light beams and N auxiliary read light beams, which are reflected from the disc-shaped record medium, to the photosensing means, and a signal generating means for producing signals based on a detection output from the photosensing means, wherein the improvement resides in that:

the optical path forming means directs the N main light beams and the N auxiliary light beams with respect to the disc shaped record medium so that N main light beam spots are formed on the disc-shaped record medium at an interval spacing of M (M is a positive integer) times a track pitch on the disc-shaped record medium, N auxiliary light beam spots are formed on the disc-shaped record medium by the N auxiliary light beams, respectively, so as to each be the same distance, corresponding to N times the interval between two adjacent main light beam spots, from the corresponding main light beam spot, and the N auxiliary light beam spots are arranged at regularly spaced intervals in the radial direction of the disc-shaped record medium from corresponding ones of the N main light beam spots, each spaced interval corresponding to K/2 (where K is an odd number) times the track pitch on the disc-shaped record medium;

the photosensing means includes photodetecting elements which are each divided substantially into two parts so as to output a pair of signals, with each photodetecting element of a first set of photo detecting elements separately detecting different ones of the N main read light beams, which form the main light beam spots, and with each photodetecting element of a second set of photodetecting elements separately detecting different ones of the N auxiliary read light beams, which form the N auxiliary light beam spots; and the signal generating means computes a first difference signal by taking the sum of the differences between detection output signals obtained respectively from the two parts of each of the photodetecting elements of the first set, computes a second difference signal by taking the sum of the differences between detection output signals obtained respectively from the two parts of each of the photodetecting elements of the second set, and computes a tracking error signal based on the difference between the first difference signal and the second difference signal.

2. An optical recording and/or reproducing apparatus according to claim 1, wherein the optical path forming means causes each of the N main light beam spots formed on the disc-shaped record medium by the N main light beams to be disposed on a separate record track.

3. An optical recording and/or reproducing apparatus according to claim 1, wherein the signal generating circuit includes level controlling means for controlling the level of the second difference signal relative to the level of the first difference signal in accordance with a ratio in intensity of the auxiliary light beams to the main light beams.

4. An apparatus for recording or reproducing signals recorded in tracks on an optical disk, comprising:
   means for generating a plurality of main light beams and a plurality of auxiliary light beams;
   photosensing means;
   means for directing each of the main light beams to impinge on a separate one of the tracks on the optical disk and each of the auxiliary light beams to impinge between the tracks;
   means for directing main read light beams, corresponding to the reflections of the main light beams from the disk, and the auxiliary read light beams, corresponding to reflections of the auxiliary light beams from the disk, to the photosensing means;
   wherein the photosensing means includes a plurality of sensors for separately sensing each of the main read light beams and the auxiliary read light beams, each of the sensors being bifurcated to produce a pair of output signals for each sensor; and
   error signal generating means connected to each of the sensors for summing the differences of the output signals from each sensor which senses a main read light beam to produce a first difference signal, summing the differences of the output signals from each sensor which senses an auxiliary read light beam to produce a second difference signal, and taking the difference of the first and second difference signals to generate a tracking error signal.

5. An apparatus for recording or reproducing signals recorded in tracks on an optical disk according to claim 4, wherein the error signal generating means includes means for adjusting the level of the second difference signal relative to the first difference signal to compensate for differences in light intensity of the main light beams on the one hand and the auxiliary light beams on the other hand.

* * * * *